Figure 1:
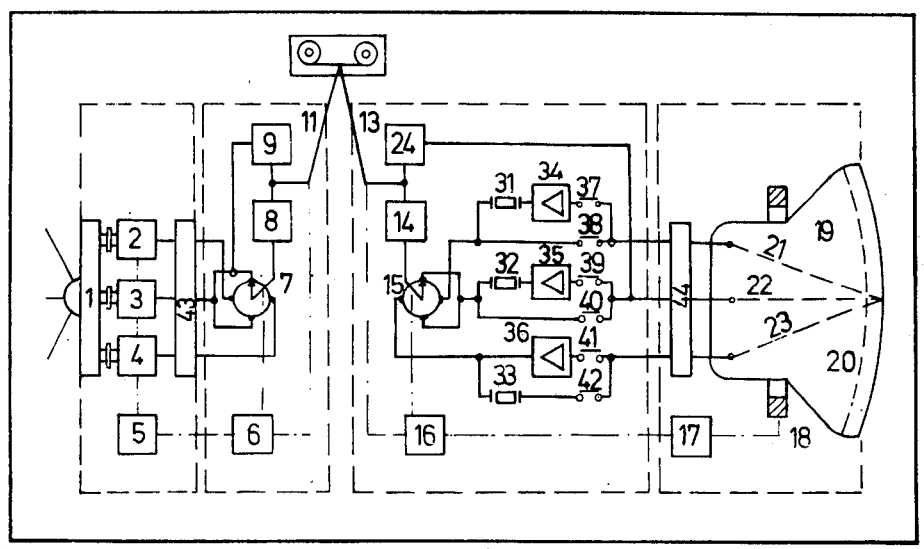

United States Patent [19]

Jaeger

[11] 4,052,734
[45] Oct. 4, 1977

[54] GRGB LINE SEQUENTIAL COLOR TELEVISION SYSTEM

[75] Inventor: Walter Jaeger, Cureglia, Switzerland

[73] Assignee: GX-Holding AG., Basel, Switzerland

[21] Appl. No.: 519,742

[22] Filed: Oct. 31, 1974

[30] Foreign Application Priority Data

| Oct. 31, 1973 | Switzerland | 15306/73 |
| Oct. 31, 1973 | Switzerland | 15307/73 |
| Oct. 31, 1973 | Switzerland | 15308/73 |
| Oct. 31, 1973 | Switzerland | 15309/73 |
| Oct. 31, 1973 | Switzerland | 15310/73 |

[51] Int. Cl.² ............... H04N 9/34; H04N 9/16
[52] U.S. Cl. ............................. 358/12; 358/49; 358/11
[58] Field of Search ............... 358/14, 15, 12, 17, 358/18, 11, 44, 48, 49

[56] References Cited

U.S. PATENT DOCUMENTS

| 2,554,693 | 5/1951 | Bedford | 358/15 |
| 2,675,422 | 4/1954 | Bedford | 358/15 |
| 2,738,377 | 3/1956 | Weighton | 358/12 |
| 2,903,505 | 9/1959 | Fine | 358/14 |
| 3,087,011 | 4/1963 | Boothroyd et al. | 358/15 |
| 3,492,415 | 1/1970 | Okada et al. | 358/12 |
| 3,507,981 | 4/1970 | Eilenberger | 358/12 |
| 3,598,904 | 8/1971 | Foerster | 358/18 |
| 3,637,919 | 1/1972 | McVoy | 358/12 |
| 3,729,579 | 4/1973 | DeBoer | 358/11 |
| 3,832,483 | 8/1974 | Jirka | 358/4 |

*Primary Examiner*—John C. Martin
*Attorney, Agent, or Firm*—Eric P. Schellin; Brian L. Ribando

[57] ABSTRACT

In a GRGB line sequential color television system, the sequential-to-simultaneous decoder in the receiver employs separate delay line and switch arrangements for each channel. Also, the sound signals associated with the green (G) portions of the sequence are transmitted in multiplex form with the other sound signals during the R and B portions of the sequence.

3 Claims, 2 Drawing Figures

GRGB LINE SEQUENTIAL COLOR TELEVISION SYSTEM

This invention relates to a colour television system and has for its object to provide such a system in a simple and convenient form.

The invention relates to a process for shooting and/or transmitting and/or storing and/or picture reproduction of TV programmes, in which three signal sequences are formed by linear combination from three camera signals ($E_R$, $E_G$, $E_B$), so that in each of the three signal sequences at least in the frequency range below 0.3 megacycles, one of the camera signals ($E_R$, $E_G$, $E_B$) predominates, and furthermore the three camera signals ($E_R$, $E_G$, $E_B$) contain at least part of the data content of mono- or colour picture patterns and a line- or picture-scanning arrangement is subordinated preferentially to the relevant picture pattern containing the colour extract for the (G) green colour data, the red colour data (R) predominating over the blue, and the blue colour data (B) predominating over the red.

Following suitable selection of the relevant equipment used, an alternative reproduction of present standard colour television programmes or recordings made by existing processes including for instance home camera recordings or Video-cassettes produced by the present process or similar storage equipment, the present process is intended preferably for the use of the selfsame black & white and colour receiving set.

Three colour extracts are required to reproduce a suitable colour image.

More than 20 years ago in the U.S.A. a time-multiplex TV transmission modifying the colour extract in a picture sequence was officially introduced for colour television transmissions. The system had to be discontinued owing to the need to operate at a different picture frequency to that of standard black & white television in order to prevent colour-flickering. All radio-television systems introduced since then (NTSC, SECAM, PAL) transmit two or three data signals simultaneously, from which the three colour extracts are made.

Since a pure time-multiplex process allows an ordinary camera to be used and also offers advantages for closed circuit systems and programme storage, it has already been suggested that a time-multiplex transmission modifying the colour extract line by line be applied not only with direct reproduction of all the lines, but also repeated with a delay of one or two line-times, hereinafter to be referred to as $\Delta t$ and $2 \Delta t$. The effective definition vertically to the direction of the lines is reduced to one-third for simple scanning, without intermediate line processing.

Angled edges of the picture reproduction also result in a coarse grid pattern even with intermediate line scanning, not only in colour pictures but also in exclusively black & white reproduced pictures. In addition to the exclusively low frequency colour data, the high frequency bearing brightness data has to be produced, transmitted, stored and reproduced in each line. On the other hand such a process calls once more for a highly complex colour camera as well as commutators and additional identification impulses and synchronising equipment for colour identification, even for the purpose of reproducing the black & white content of the programme by way of a black & white receiver.

The present invention is preferably intended to produce a relevant colour by means of the normal transmission and storage procedures avoiding frequency bands hitherto used for black & white television, under the conditions at present applicable to:

home cameras and simple programme storage equipment, as developed to date for black & white Video cassettes and picture records for audio-visual equipmemt;

closed circuit transmission systems, such as cable TV, industrial-TV and reporter cameras for radio-television;

TV radio television in countries only just introducing television or for satellite-TV where multi-channel speech facilities are important.

The relevent purpose is achieved according to the invention, whereby as well as colour arrangement identification (I), during each line period a line signal is generated for each of the three color components of a picture. During each line period, only one of the signals is utilized and during every other line period, the camera signal $E_G$ is caused to predominate.

The application of the process is intended to facilitate simultaneous reception and/or transmission and/or storage and for instance reproduction of further data integrated within the picture signal, preferably for multi-lingual programmes or stereoscopic music reproduction.

This is achieved in that the further data (Z) is only integrated and/or transmitted and/or stored and/or separated for reproduction, exclusively during every second line, excluding the transmission duration of the signal sequence, which is at least within the frequency range of less than 0.3 megacycles, and associated with the colour signal mainly containing the green picture data.

The present process, hereinafter to be known as the GX-process, since G for "green" and X for "red or blue" are transmitted and stored in alternate lines, allows a simple and in certain cases improved reception, transmission, storage and reproduction of mono- or colour pictures with the following attendant advantages:

The frequency band required for transmission is no greater than for black & white transmissions and the band width has no effect upon the colour reproduction.

Phase errors in the transmission chain, viz. in a Video cassette have no effect.

Colour interference cannot arise, since no auxiliary colour carrier is required.

Cross modulation cannot occur, since only one colour is transmitted at a time.

No colour burst is required. Intervals in the linereturn remain free for other purposes.

A compatible flicker-free black & white picture is possible, though the simply reproduced green extract will normally suffice.

The colour receiver requires no localised oscillator and no compensation circuit for the phase position of an auxiliary colour carrier.

Simple application with multi-lingual programmes or stero music reproduction is particularly suited to the GX-system in the case of audio-vision and satellite transmissions.

The present GX-process is based on the use of part of the residual redundancy present in normal TV channels of the present standard number of lines and the picture scanning frequencies.

Effective functional features of the GX-system are confirmed by the combined effect according to the following eight features:

Detail contrast (Lit. 1, Vol. 1, p259 & 307) is essential to produce subjective picture sensitivity, i.e., sharp definition is induced by good contour slope conductance.

Brightness distribution along the lines is more important than vertical brightness for the purpose of moving TV images (Lit. 1, Vol. 1, p.83, 259 & 269).

Brightness distribution is unimportant within a particular point of an image, so long as the point remains small in relation to the resolution capacity of the human eye (Lit. 1, Vol. 1, p.81).

The viewing distance of a line-jump produced TV image must be at least 1½ times as great as the line resolution requires (Lit. 2) particularly in order to avoid the impression of double-line creep (Lit. 3).

A doubled limit frequency in the transmission channel would be required for full utilisation of the available clarity and resolution of a present-day 625-line TV picture, (Lit. 4).

The section of the electron-beam scanning the picture would only have to be 1/1000th of the picture height (Lit. 5) for full utilisation of the available clarity of a 625-line reproduced picture, but would have to overlap in order to avoid the ladder effect of the scanning line distance (Lit. 6); this means that the picture would have to be scanned with twice the number of lines.

Vertical resolution of a picture, wherein data is only reproduced by every second of 625 lines, though twice one after the other, is always better than that obtained with the transmission characteristic (Lit. 7) produced by horizontal resolution at 5.25 megacycles band-width of the transmission channel.

In order to reproduce a clear black & white or colour picture made up from three colour extracts added together, a three to five times less sharp red and blue colour extract is required compared with the green extract, in spite of the fact that the resolution capacity of the viewing equipment used is of approximately the same magnitude for green, red and blue (Lit. 8) for monochrome pictures and the same brightness.

The GX-process allows the use of a simple recording camera with a single camera tube or with semi-conductors, since only one item of information is required at a time.

A good picture can be produced with the GX-process from single data, since individual or all signal sequences are repeated several times.

Special advantageous linkages between line number and colour change during the picture change are outlined below.

The GX-signal can be modulated in such a manner that it can be fed to a normal colour receiver, and further data can then be integrated and retransmitted.

Figure 2:
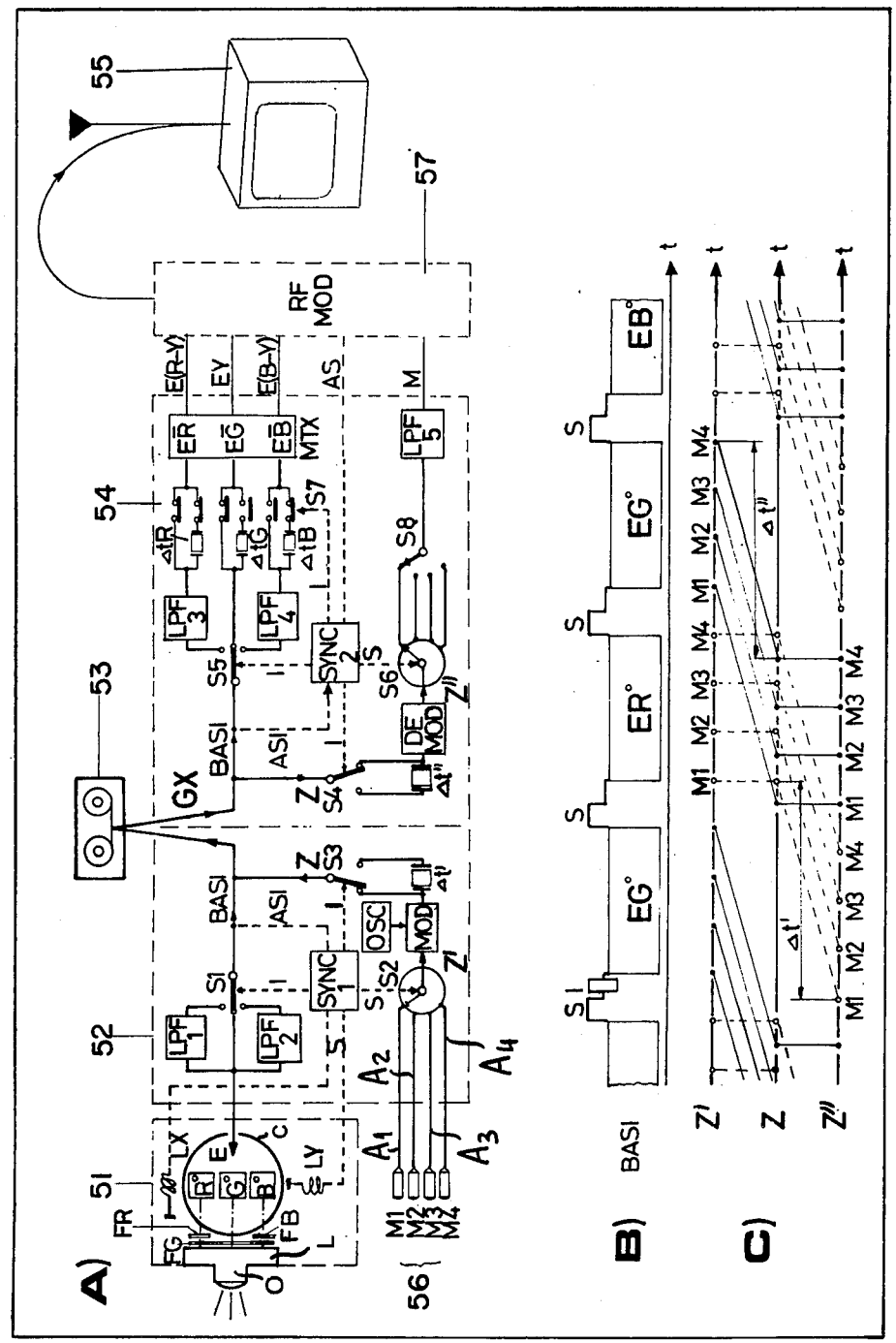

Examples of the invention are detailed below with the aid of the drawings:

FIG. 1 shows a complete reception, transmission, storage, and reproduction system in accordance with the present GX-process using colour differentiation signals with transmission signal sequences doubled or even quadrupled by delaying conductors, and in connection with the colour matrix of a normal colour picture receiver, FIG. 2 shows a diagram of a multi-channel sound transmission using the GX-system.

In FIG. 1 the following will be noted: the photo-lens 1 and optical light-distributor, with the three camera tubes 2, 3, 4 producing the green $E_G-$, red $E_R-$ and blue $E_B-$ camera signals, and the equipment producing the synchronous signal S. None of the above items have any special characteristics and the camera signals can also be supplied through the colour-outlet of a normal RGB colour receiver. The synchronous transformer 6 ensures the line by line green/red/green/blue transition by means of the electronic switch 7, and also supplies the identification-impulse 'I' to the transmission channel 11. As shown, even though it is not always generally necessary, the high frequencies of all three camera signals are mixed in the requisite ratios by the unit 43 and supplied by way of a high pass filter 9 to the transmission channel, and the signal sequences obtained for the switch 7 are limited to the lower frequencies by the low pass filter 8 and supplied to the transmission channel.

The transmission system used for the transmission channel 11 may be cable or a wireless. Likewise, the transmission system used for channel 13 from the storage unit 12 may be cable or wireless. The storage unit 12 may be a Video cassette or a disc recording unit. The receiver synchronising unit 16 controls the electronic switching unit 15 operating in line sequence, as well as the picture scanner 18, synchronously with the signals S and I produced for picture scanning at 5 and 6. The identification signals I actuate the switch 15 as outlined above, which then runs automatically for at least 4 lines, then reverses in sequence on green/red/green/blue. The horizontal synchronous signals S serve as usual to regulate the frequency of the line oscillator 17 by phase compensation, thus supplying the scanner 18 with the horizontal scanning impulses.

An eventually added high frequency signal sequence is separated by the low pass filter 14 and high pass filter.

In order to use a normal commercial shadow mask cathode ray tube and to avoid any light intensity defects, delay lines 31, 32, 33 can be used. Preferably, and as shown in FIG. 2 only one delay line in which the signal circulates several times is used for the fourfold reproduction of the red and blue lines. The repeated signal is amplified by the amplifiers 34, 35, 36 until is has the same strength as the original signal. Electronic switches 37-42 serve for input to the c.r.t. or feedback to the delay line of signal sequences for each line and are actuated by synchronization and identification impulses produced by transformer 6 and synchronizer 16.

Satisfactory reproduction of a subjectively sharply defined picture is possible, providing the signal mainly comprising the green picture components be transmitted on a wide band. The residual band-width during transmission of red and blue lines can be used for transmission of several speech channels. FIG. 12 shows a typical example, switched to four microphones by means of an auxiliary carrier to form a time-multiplex. Suitably wide sound frequency band transmission is only possible, providing each microphone receives an impulse during each line. Impulses received during reproduction of the mainly green signal are delayed by approximately one line through the retarding conductors $\Delta t'$, so that they are transmitted and stored within the gaps between red and blue line impulses.

For reproduction purposes, sound signals received during red and blue lines, are delayed in the retarding conductor $\Delta t''$. This avoids a modulation of the sound with the line frequency. The total signal for the four microphones is consequently reproduced with a time-lag of approximately one line.

In greater detail FIG. 1 shows, in block diagram form, the essential elements of a GX-device for shooting — storing — picture reproduction, and shows the time sequence of video and audio signals. The upper portion of the drawing is the operational system. The middle portion shows the time sequence of the base signal, and the lower portion of the drawing shows, the time arrangement of the signals from four audio channels M1 . . . M4.

In the upper portion of the drawing;

51 is the camera, 52 is the coder, 53 the recorder, e.g., a magnetic band device, 54 the decoder, 55 a television set of commercial type as a monitor, 56 the microphones and 57 a radio frequency modulator.

In the camera 51 are produced three pictures $R^o$, $G^o$, $B^o$ by means of a lens O with following filters FG, FR and FB. Care is taken to ensure that the three pictures $R^o$, $G^o$, $B^o$ contain the red, the green and the blue picture data. An electron beam in the camera tube is deflected by the deflection coils LX and LY, so that it scans the three pictures linearly in G/R/G/B sequence. Thereby the picture signal sequence shown in the centre portion of the drawing is produced, and consists of $EG^o$, $ER^o$, $EG^o$, $EB^o$.

In the coder 52, the black out impulse $-A$, the synchronising impulse S and the identification impulse I, produced in the synchronizer SYNC 1, are added to the picture signal, so that the base signal BASI is obtained. The switch S1 is controlled in such a way by the synchronizer SYNC 1, that the two low pass filters LPF1 and LPF2 limit the high frequency of the blue picture during the scanning of the red picture R/O and the blue picture B/O. This limitation is necessary in order to transmit the audio signal Z at the same time with the picture information EB and ER frequency multiplex. The audio signal Z is derived from four signals A1-A4 originating in the microphones. The switch S2 controlled by the synchronizer SYNC 1 selects separate parts of the four continuous audio-signal sequences A1-A4, and so forms the audio signal Z'. This signal Z' is utilized in the modulator MOD to modulate a carrier wave $A^o$ produced in the oscillator OSZ. The frequency of the carrier wave $A^o$ is arranged to be higher than the limit frequency of the low pass filters LPF1 and LPF2. So that no interference with the higher frequencies of the picture signal can occur during the scanning of the green picture $G^o$, the modulated carrier is switched by a switch S3, controlled by the synchronizer SYNC 1, around about one delayed line-time $\Delta t$. The resulting delay $\Delta t$ causes the signal sequence Z, seen in lower portion of FIG. 1, so that it only contains audio information during the length of the transmission of the red or the blue picture information.

The recorder 53 can consist of any storage device.

The decoder 54 contains a synchronizer SYNC2 which is maintained in synchronism with the synchronizer SYNC 1. The switch S5 guides the picture signals $EG^o$, $ER^o$, $EG^oO$ at any given time to their proper channel. In the red and the blue channel lie the low pass filters LPF3 and LPF4. The filters prevent audio signals disturbing the picture. In order that there is no rough banded structure in the reproduced picture, the scanning line of the green picture is repeated once by the delay conductor $\Delta tG$ and the scanning lines of the red and blue pictures are repeated three times by the delay conductors $\Delta tR$ and $\Delta tB$. The repeat is done in the marked example by the switch S7. The matrix MTX produces out of the signals ER, EG, EB the brightness signal EY and the two colour difference signals E(R-Y) and E(B-Y). A radio-frequency modulator RF MOD 57 receives the brightness, the colour difference signals and a blanking signal AS to provide a modulated FR signal to operate the colour television receiver 55.

The switch S4 guides the audio signal Z alternately directly or through a delay conductor $\Delta t''$ to a demodulator DE MOD. The resulting audio signal Z'' corresponds exactly to the original signal Z' except that it is delayed by about the time $\Delta t'$. The switch S6 switches in synchronism with the switch S2, so that the switch S8 can be used to select one of the four audio signals A1–A6. The low pass filter LPF5 then establishes the audio signal M to a loud speaker.

BIBLIOGRAPHY QUOTED HEREIN

1 SCHROTER F. Fersehtechnik, pt. 1, ed. SPRINGER 1956, pt. 2 SPRINGER 1963
2 BROWN E. F. Low resolution TV: Subjective comparison of interlaced and non-interlaced pictures - Bell System Technical Journal Jan. 1967, Vol. 46, pp. 199–232
3 WEISS G.: "German TV-broadcasting standardisation." Fernsehtechn. Vol. 8 (1937) pp. 45–47
4 SCHUNACK J. "Influence of transmitted frequency band on quality of TV picture" Electr. Ubertragungst. Vol. 5 (1950) p. 113 et seq.
5 SCHADE O. H.: Electro-optical specs. for TV systems, R.C.A. Review Vol. 9 (1948) pp. 245–286
6 WHEELER H. A. & LOUGHREN A. V.: Fine Structure of TV Images, Proc. Inst. Radio Engrs. N.Y. Vol. 26 (1938) p. 540 et seq.
7 KELL R. D. & FREDENDALL G. L.; Selective sideband transmission in TV R.C.A. Review, April 1940
8 BALDWIN M. W.: Subjective Sharpness of additive colour pictures Proc. Inst. Radio Egnrs. N.Y. May 1951, pp. 1173–1176

I claim:

1. In a television system, the combination of:
   A. means for producing at a transmitter three color-video-signals $EG^o$, $ER^o$ and $EB^o$, in which the signal $EG^o$ contains predominantly the information content present in the green component of a picture, the signal $ER^o$ contains predominantly the information content present in the red component of a picture, and the signal $EB^o$ contains predominantly the information content present in the blue component of a picture;
   B. first switching means for supplying said three signals, one at a time, in a cyclic sequence of four successive scanning line time intervals, with the signal $EG^o$ occurring in every other one of the four time intervals, and with the color signals $ER^o$ and $EB^o$ occurring alternately in the two time intervals which intervene between said every other one of the four time intervals;
   C. means for supplying a synchronizing signal for each time interval;
   D. means for supplying an identification signal for each fourth time interval;
   E. means, under the control of said synchronizing signal and identification signal, for separating the signals $EG^o$, $ER^o$ and $EB^o$, occurring in the time intervals of said cyclic sequence, and supplying the separated signals to three separate video color circuits, each individual to one of said signals, whereby the signals $EG^o$, $ER^o$ and $EB^o$ intermittently appear during their respective time intervals in their respective video color circuits; and F. means for supplying three outputs, said means including time delay and second switching means under the control of said synchronizing signal and said identification signal for causing the intermittently appearing signal $EG^o$, $ER^o$, and $EB^o$ in respective ones of said three video color circuits to be repeated, individually, in said respective ones of said three video color circuits during the time intervals in which said separating means does not supply a signal to the respective ones of said video color circuits, whereby each of said three video color circuits substantially continuously supplies to the respective one of the said three outputs a signal corresponding to the signals $EG^o$, $ER^o$, and $EB^o$.

2. The television system of claim 1 wherein the time delay and second switching means comprise three independent video signal repeaters, one for the first, one for the second and one for the third video signal, each repeater characterized by an ultrasonic delay line connected with at least one electronic switch and an amplifier in a closed circuit whose delay time corresponds exactly to the scanning line repeating time, and wherein the said electronic switch is actuated in such a manner that the desired repeated and delayed video signals occur.

3. In a television system, the combination of:
A. first means for producing at a transmitter three color-video-signals $EG^o$, $ER^o$ and $EB^o$, in which the first signal $EG^o$ contains predominantly the information content present in the green component of a picture, the second signal $ER^o$ contains predominantly the information content present in the red component of a picture, and the third signal $EB^o$ contains predominantly the information content present in the blue component of a picture;
B. second means for producing at the transmitter and third means for separating at the receiver a line synchronizing signal produced, transmitted, separated, and used in the interval of each scanning line, and an identification signal in the picture interval time of every fourth scanning line; this change was required to correct an obvious omission.
C. fourth means to switch the signals $EG^o$, $ER^o$ and $EB^o$ at the transmitter and fifth means at the receiver to switch the same signals such that during each signal period only one signal is represented and during every other signal period the first signal $EG^o$ is represented;
D. sixth means to repeat the first signal $EG^o$ once and to repeat the second and third signals $ER^o$ and $EB^o$ three times; and
E. seventh means comprising a first electronic switch in the transmitter to add to the transmitted signal a supplementary information signal during the transmitting time of the second and of the third video signals $ER^o$ and $EB^o$, and a second electronic switch in the receiver to receive the supplementary information.

* * * * *